United States Patent [19]
Violi et al.

[11] Patent Number: 5,894,788
[45] Date of Patent: Apr. 20, 1999

[54] TRAY FOR HEATING FOOD

[75] Inventors: Jean-Charles Violi; Raymond Violi, both of Marlens; Jean-François Ferbus, Seythenex, all of France

[73] Assignee: Societe Cooperative de Production Bourgeois, Faverges, France

[21] Appl. No.: 08/956,842

[22] Filed: Oct. 23, 1997

[30] Foreign Application Priority Data

Oct. 24, 1996 [FR] France .................. 96 13155

[51] Int. Cl.$^6$ .............. A47J 39/02; A47B 31/02; H05B 6/02; H05B 6/12
[52] U.S. Cl. .................. 99/483; 99/447; 99/448; 99/451; 99/DIG. 14; 165/64; 165/919; 219/386; 219/620; 219/622
[58] Field of Search ............ 99/331–333, 342, 99/370, 447, 448, 451, 468, DIG. 14; 126/246, 375; 165/61, 48.1, 63, 64, 267, 201, 918, 919; 219/620–622, 386, 387, 626, 649, 521, 506, 660, 753, 725, 502; 374/141, 149, 150, 162; 392/449, 459; 426/237; 312/236

[56] References Cited

U.S. PATENT DOCUMENTS

| | | | |
|---|---|---|---|
| 4,235,282 | 11/1980 | de Filippis et al. | |
| 4,323,110 | 4/1982 | Rubbright et al. | 165/64 X |
| 4,776,386 | 10/1988 | Meier . | |
| 4,777,931 | 10/1988 | Ziegler et al. | 126/146 |
| 5,086,834 | 2/1992 | Grandi | 165/48.1 |
| 5,182,438 | 1/1993 | Oakes et al. | 219/386 |
| 5,245,150 | 9/1993 | Grandi | 165/61 X |
| 5,273,360 | 12/1993 | Wyatt et al. | 99/448 |
| 5,285,051 | 2/1994 | DeGrow et al. | 165/919 X |
| 5,403,997 | 4/1995 | DeGrow et al. | 165/919 |
| 5,424,427 | 6/1995 | Lee | 219/665 X |
| 5,466,915 | 11/1995 | Meier et al. | 99/451 X |
| 5,505,122 | 4/1996 | Gerrit | 99/483 X |
| 5,603,858 | 2/1997 | Wyat et al. | 99/DIG. 14 |
| 5,628,241 | 5/1997 | Chavanaz et al. | 99/483 X |

FOREIGN PATENT DOCUMENTS

| | | |
|---|---|---|
| 203883 | 12/1986 | European Pat. Off. . |
| 666047 | 8/1995 | European Pat. Off. . |
| 2375853 | 7/1978 | France . |
| 2383637 | 10/1978 | France . |
| 3637660 | 5/1987 | Germany . |
| 19507083 | 9/1996 | Germany . |

*Primary Examiner*—Timothy F. Simone
*Attorney, Agent, or Firm*—Ratner & Prestia

[57] ABSTRACT

A tray for warming food has a tray body of double cup shape formed of a plastics material base structure with an aluminum top diffusion layer attached to the base structure in the part to receive a cloche. The cloche has a plastics material outer jacket fastened to an aluminum bottom diffusion layer in contact with an intermediate member made of a material that can be heated by magnetic induction. The top diffusion layer of the tray body comes into contact with the bottom diffusion layer of the cloche at the periphery of the interior space along peripheral contact rims This provides a meal tray assuring fast heating of food placed in the interior space of the first part, the second part being intended to carry food that is to remain cold.

11 Claims, 8 Drawing Sheets

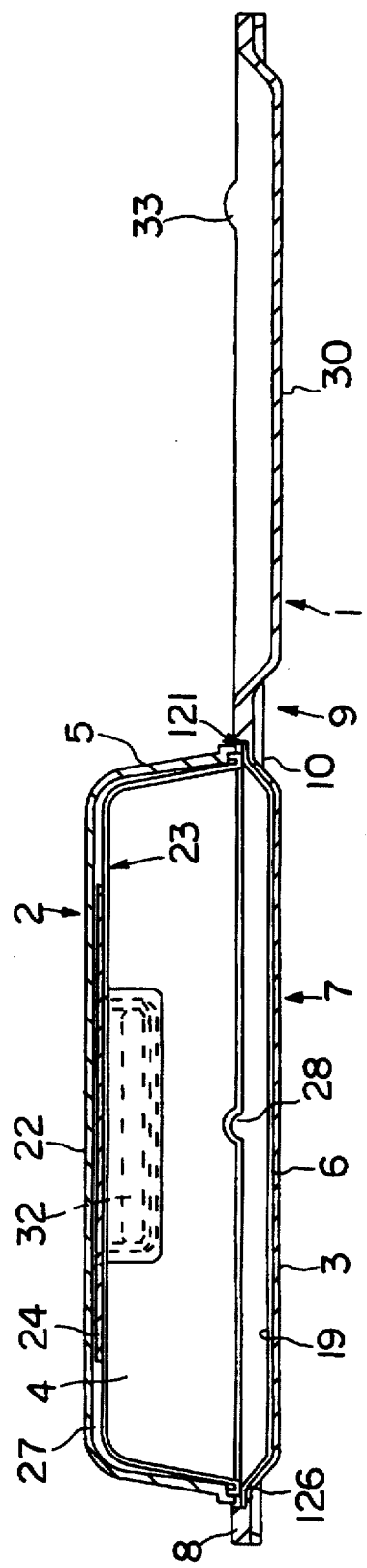
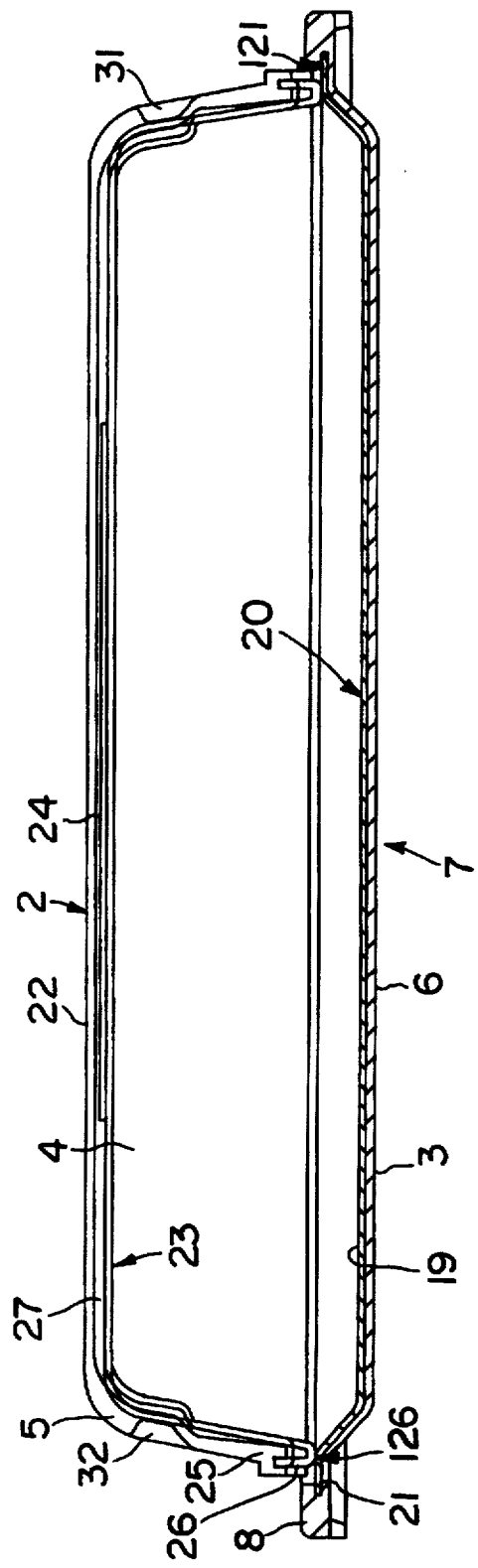

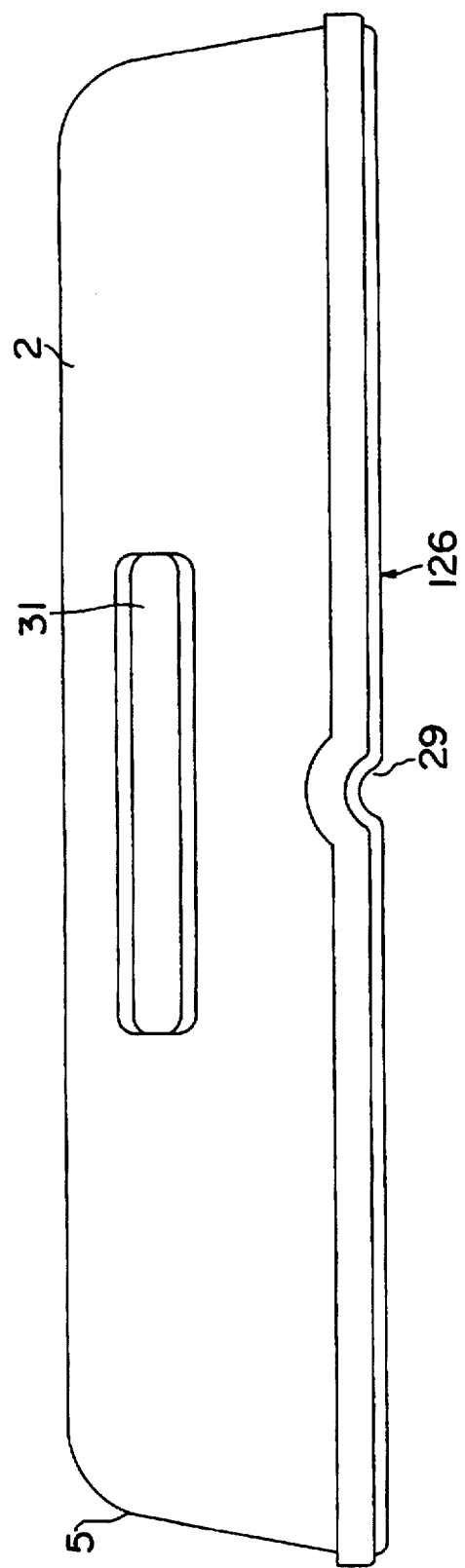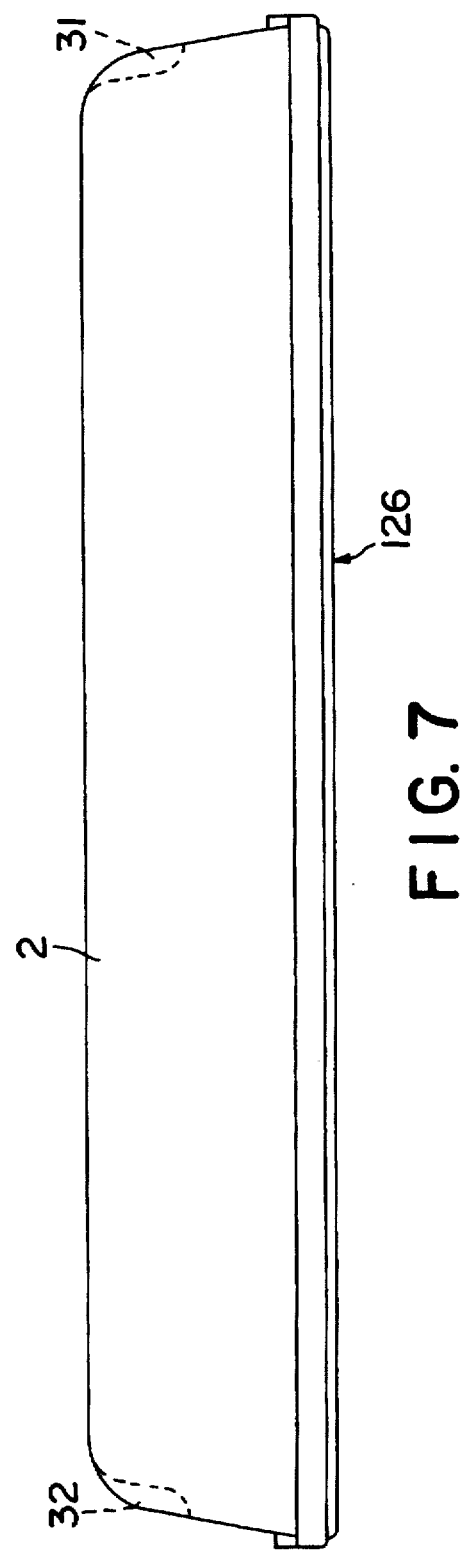

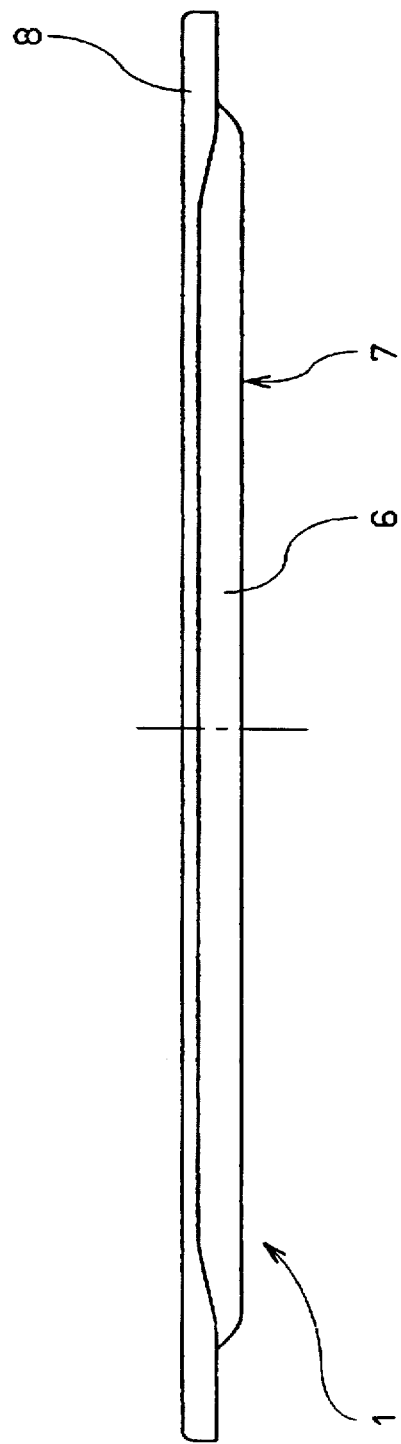
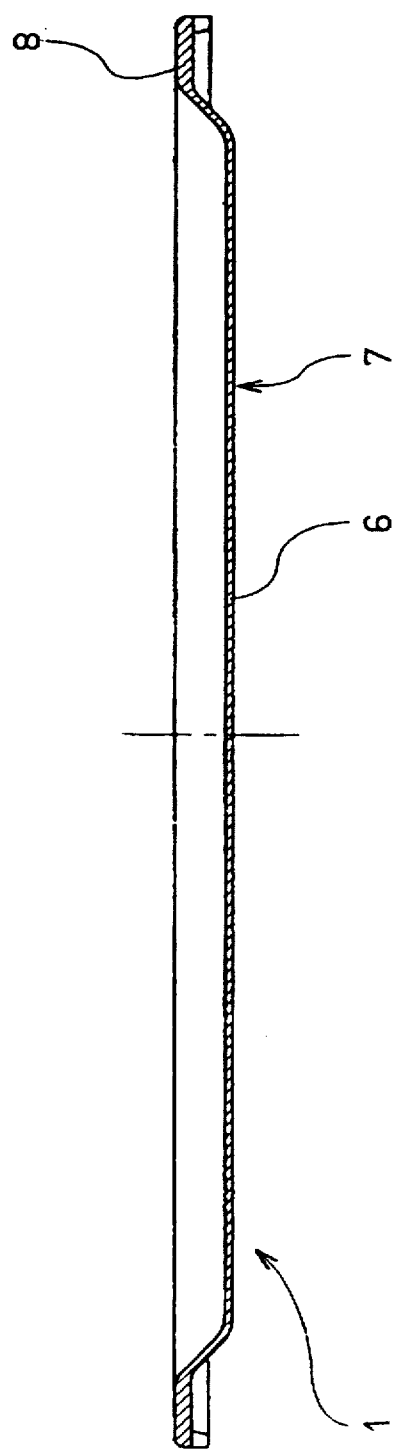

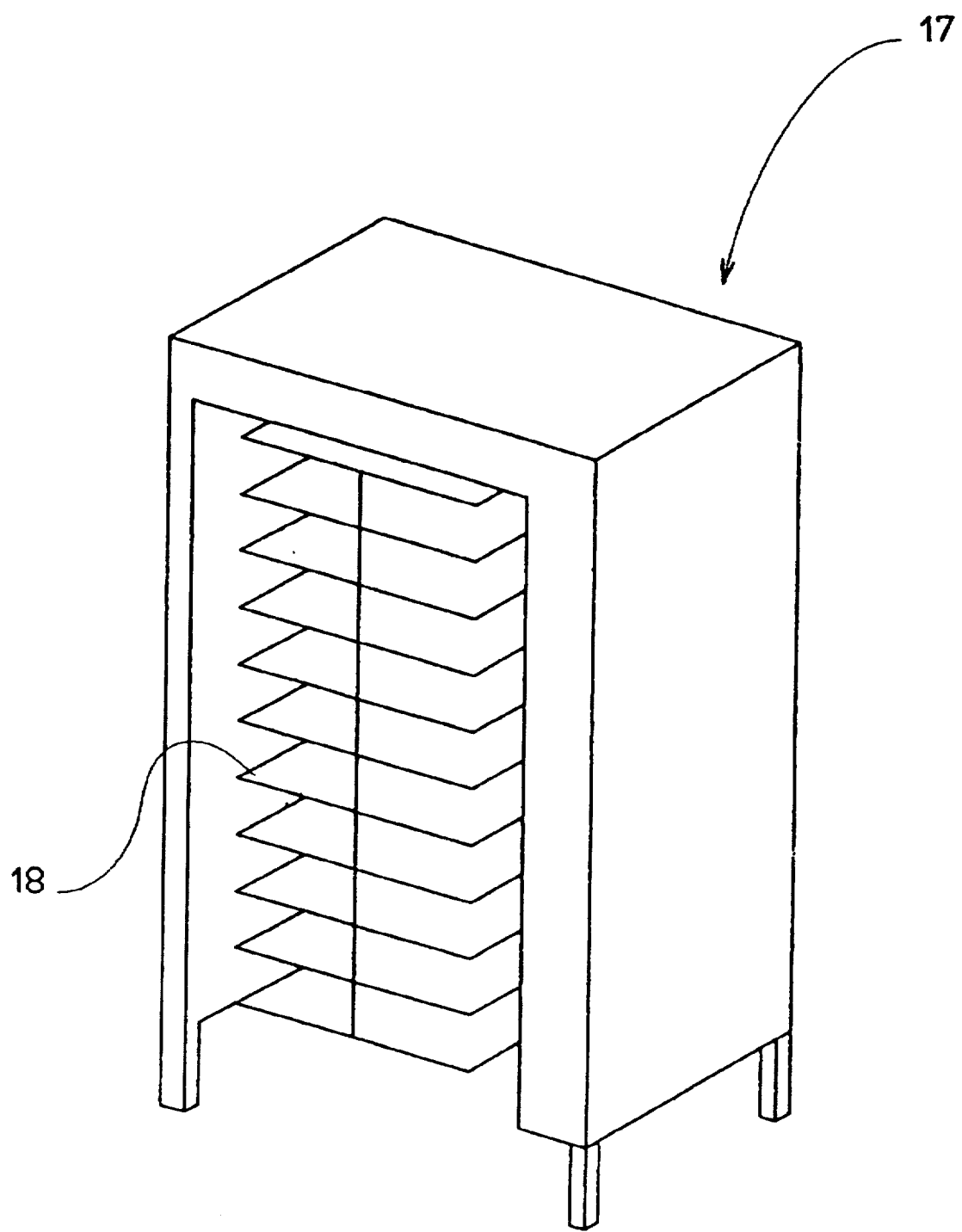
Fig_11

TRAY FOR HEATING FOOD

BACKGROUND OF THE INVENTION

1. Field of the Invention

The present invention concerns devices for heating food on meal trays, for example for distributing meals in institutions, canteens, hospitals.

The invention is more partially directed to devices of this kind in which the food is heated by induction heating.

2. Description of the Prior Art

Devices of this kind for heating food are already known in themselves, as described in document FR 2 383 637 A; for example, including means for supporting a series of trays one above the other with a suitable distance between them and a series of induction shelves containing induction coils connected to a high-frequency generator, the induction shelves fitting between the successive trays in a tray heating area.

The food to be heated is placed on thin aluminum plates placed on an insulative material tray, the plates being covered by a removable insulative cloche with its inside face coated with a metallic film.

A high-frequency alternating current flows through the induction coils, generating a high-frequency alternating magnetic field in the tray heating area that heats the thin aluminum plate and the metallic bottom face of the cloche by magnetic induction.

A device of the above kind requires aluminum plates. Apart from the fact that this considerably complicates cleaning or requires disposable plates, the food is contained directly in the thin aluminum plate which constitutes a container that is not agreeable for the consumer and may be damaged by the necessary handling of the dishes during use.

Slow heating and uneven heat distribution also occur.

Uneven heat distribution is also encountered with the magnetic steel plate device described in document EP 0 666 047 A, with the bottom electrical element heating device described in document FR 2 375 853 A, with the cloche device provided with an anti-condensation internal metallic heating plate described in document DE 195 07 083 A or with the containers with peripheral and bottom external metallic plates described in document EP 0 203 883 A.

The problem addressed by the present invention is that of designing a new meal tray structure for heating food by magnetic induction in which any type of plate or other food container can be used and which significantly increases the rate of heating and assures an even distribution of heat in the food.

The meal tray of the invention must further have satisfactory qualities in terms of meeting hygiene standards, enabling efficient cleaning and totally preventing the risk of the growth of bacteria and other pollutants.

Furthermore, it must be possible to manufacture the meal tray structure at reasonable cost.

SUMMARY OF THE INVENTION

To achieve the above and other objects, the invention consists in a tray for heating food by insertion in an alternating magnetic induction field produced by an external magnetic induction field generator device, comprising a lower tray body and a removable upper cloche that can be placed on at least a part of the tray to delimit an interior space between the tray body and the cloche surrounded by a peripheral wall and able to contain said food to be heated, with at least one member made from a material that can be heated by magnetic induction placed in the interior space; the tray body has a plastics material base structure forming a bottom exterior surface and edges and including, at least on the part receiving the cloche, a top diffusion layer of a non-magnetic metal that is a good conductor of heat attached to the base structure; the cloche has a plastics material outer jacket fastened to a bottom diffusion layer made of a non-magnetic metal that is a good conductor heat itself in contact with at least one intermediate member made from a material that can be heated by magnetic induction; the top diffusion layer of the tray body comes into contact with the bottom diffusion layer of the cloche at the periphery of the interior space in portions of respective peripheral contact rims of the top and bottom diffusion layers.

A structure of the above kind produces a better distribution of heat in the food, avoiding hotspots likely to overcook food in some areas, whilst assuring fast overall heating. The diffusion of heat is efficient and the structure assures good magnetic coupling with the coils producing the magnetic field.

In one advantageous embodiment at least two orifices are formed in opposite areas of the lower part of the peripheral wall around the interior space. During heating, cold air leaves via these orifices with the result that air heated by the members that can be heated by magnetic induction and by the diffusion layers can quickly occupy all of the interior space to contribute to the heating of the food by conduction and convection. This significantly speeds up warming and a warming time saving of 20% to 50% has been achieved.

The orifices are preferably notches or deformations in the contact edge of the cloche or of the tray body. Notches or deformations are much easier to clean and guarantee compliance with hygiene conditions.

To enable manufacture at low cost the tray body can advantageously comprise a thermosetting plastic material base structure associated with the preformed diffusion layer, the edges of said diffusion layer being embedded in the base structure plastics material.

The cloche can include a plastics material outer jacket associated with the preformed diffusion layer, the edges of said outer jacket being glued into an upstanding rim of the diffusion layer.

In one advantageous embodiment assuring good thermal insulation of the interior space and reducing heating of the external part of the plastics material cloche, the external jacket and the cloche diffusion layer are fastened together at their edges, leaving a thin layer of air between the outer jacket and the diffusion layer in the central part of the cloche.

Other objects, features and advantages of the present invention will become apparent from the following description of specific embodiments given with reference to the accompanying drawings.

BRIEF DESCRIPTION OF THE DRAWINGS

FIG. 2 is a longitudinal section taken along the line 2—2 in FIG. 1.

FIG. 3 is a cross-section to a larger scale taken along the line 3—3 in FIG. 1.

FIG. 6 is a front view of the cloche from FIG. 4.

FIG. 7 is a lefthand side view of the cloche from FIG. 4.

FIG. 8 is an end view, as seen from the righthand side in FIG. 2, with the cloche removed, showing the transverse profile of the tray body.

FIG. 9 is a cross-section of the tray taken along the line 9—9 in FIG. 1 with the cloche removed.

FIG. 11 is a perspective view of a console adapted to cooperate with the trolley from FIG. 10.

DETAILED DESCRIPTION OF THE PREFERRED EMBODIMENT

Figure 1:
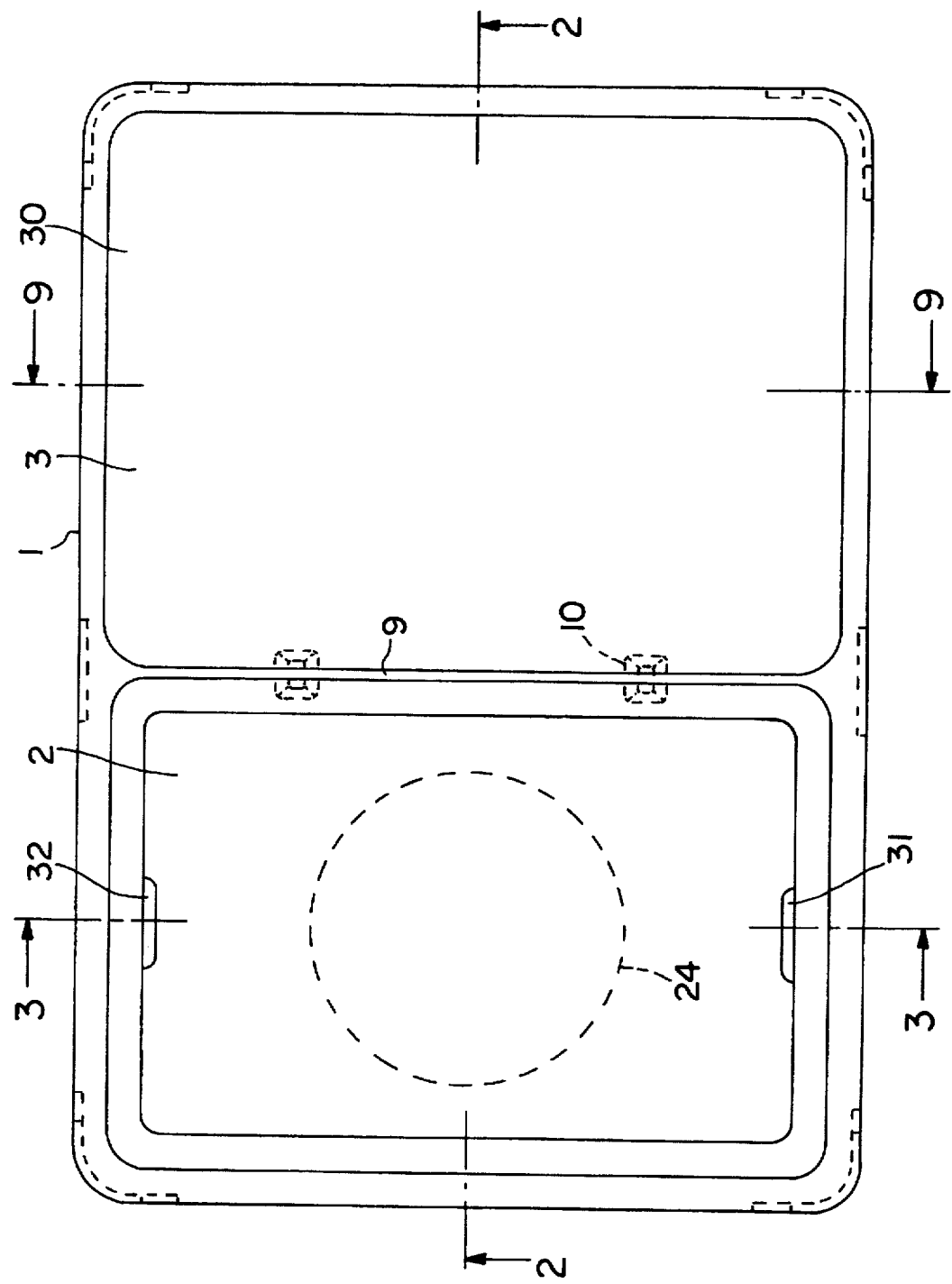
FIG. 1 is a plan view of a meal tray constituting one embodiment of the present invention.
Figure 4:
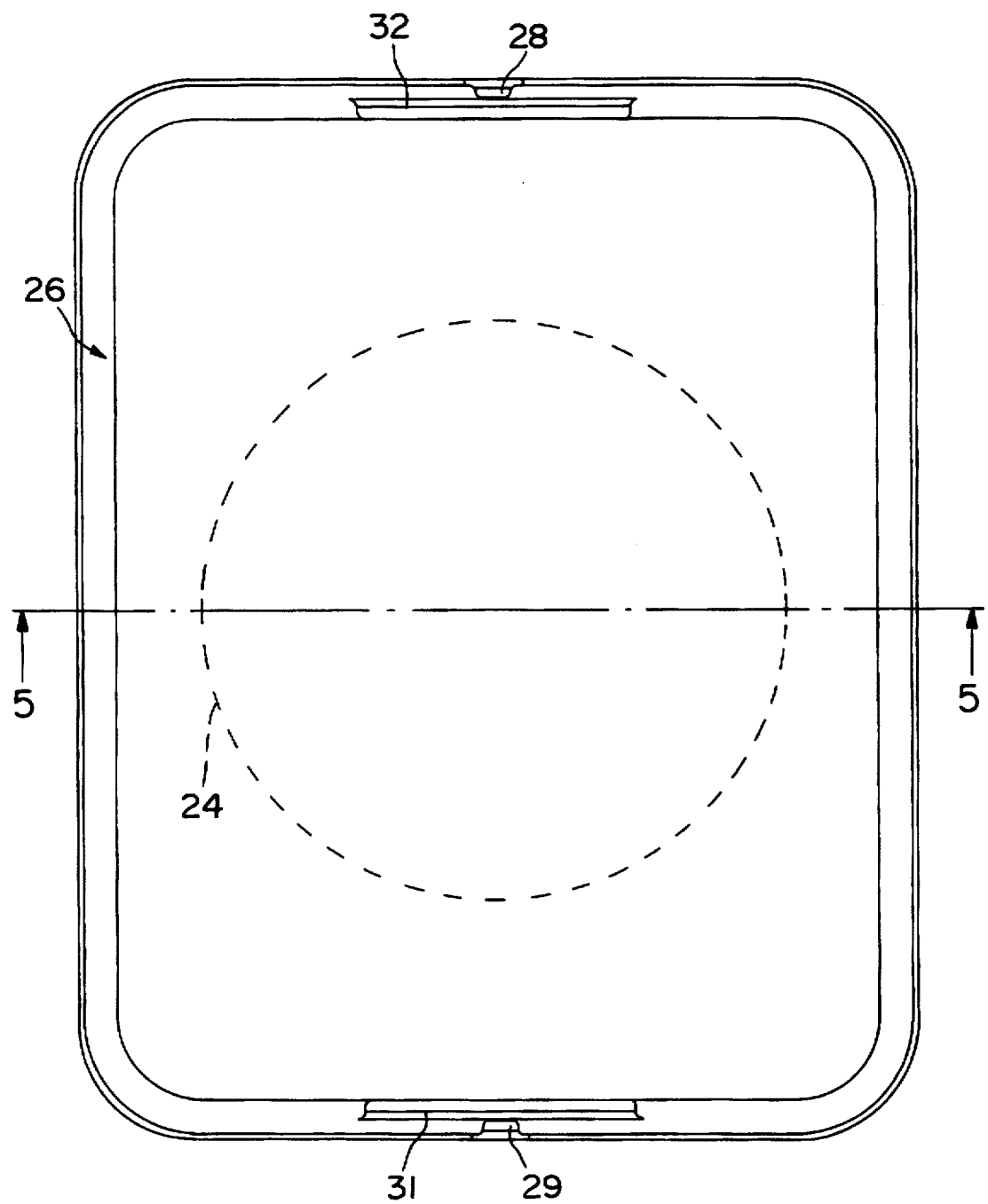
FIG. 4 is a bottom view of a cloche of one embodiment of the present invention.

In the embodiment shown in FIGS. 1 through 9, a tray in accordance with the invention for heating food comprises a lower tray body 1 and a removable upper cloche 2 that can be placed on at least a portion 3 of the tray to delimit between the tray body 1 and the cloche 2 an interior space 4 surrounding by a peripheral wall 5 and able to contain food to be heated.

The tray body 1 comprises a plastics material base structure 6 forming a bottom external surface 7 and edges 8. In the embodiment shown the base structure 6 has two parts each of which is generally cup shaped, namely the first part 3 adapted to receive the cloche 2 covering the food to be heated and a second part 30 adapted to support food that is to remain cold.

The two cup shaped parts 3 and 30 of the tray body 1 are connected by a raised intermediate area 9 provided with stiffening members 10 such as ribs.

Figure 10:
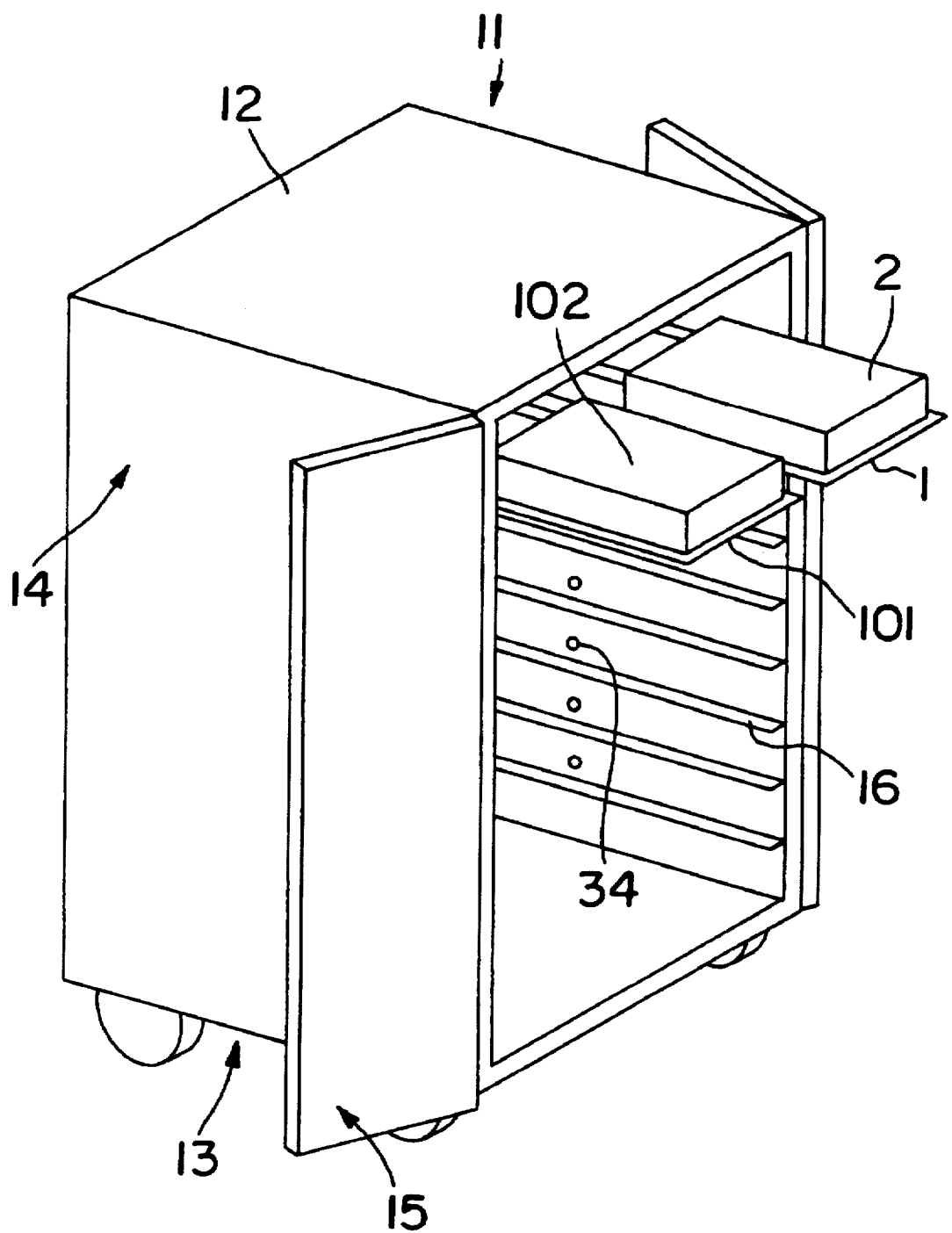
FIG. 10 is a perspective view of a trolley suitable for transporting meal trays in accordance with the present invention.

As shown in FIGS. 10 and 11, a tray in accordance with the invention for heating food is adapted to be used to heat food by insertion in an alternating magnetic induction field produced by an external magnetic induction field generator device. For example, the tray previously described, including the tray body 1 and the cloche 2, can be engaged in slides 16 provided in a mobile trolley 11. The trolley 11 is closed by top and bottom walls 12, 13 and a peripheral wall 14 including at least one front door 15. For example, a trolley 11 can be provided in which two tray bodies can be placed side by side on each level, such as the tray bodies 1 and 101, carrying cloches such as the cloches 2 and 102. The trays are mounted on slides like the slide 16 enabling them to slide longitudinally for serving.

In a coupled food heating position, the trolley 11 with the door 15 open is placed against the opening of a fixed console 17 shown in FIG. 11. The fixed console 17 includes a series of horizontal induction shelves like the shelf 18, said shelves engaging in the trolley 11 between the tray areas fitted with the cloches 2 or 102. The induction shelves 18 include magnetic induction coils connected to a high-frequency alternating current generator housed in the fixed console 17 and generate a high-frequency magnetic field in the space into which the first part 3 of the trays including the cloches 2 is inserted. For example, a magnetic field generator device like that described in document FR 2 383 637 A can be used, or any other type of device generating a magnetic field at an appropriate frequency for magnetic induction heating of members made from a material that can be heated by magnetic induction.

Referring again to FIGS. 1 to 3, 8 and 9, the base structure 6 of the tray body 1 includes, on the part 3 receiving the cloche 2, a top diffusion layer 19 of a non-magnetic metal that is a good conductor of heat, for example, aluminum, attached to the base structure 6. The top diffusion layer 19 can advantageously be covered, at least on its visible side 20, with a layer of black polytetrafluorethylene or black enamel, promoting radiation of heat towards the food.

The plastics material base structure 6 can be constructed from a thermosetting plastics material blank that is cold pressed before hardening onto the diffusion layer 19 which is with a cup shape. During pressing, the edges 21 of said diffusion layer 19 are embedded in the plastics material of the base structure 6, assuring mechanical fastening and a seal between the base structure 6 and the diffusion layer 19. The plastics material is then heated to an appropriate temperature to harden it. The pressing and heating operations can be simultaneous.

As can be seen in FIGS. 2 through 7, the cloche 2 includes a plastics material, for example a thermosetting plastics material, outer jacket 22 attached to a bottom diffusion layer 23 made of a non-magnetic metal that is a good conductor of heat, for example aluminum, with the visible side covered with black polytetrafluorethylene or black enamel. The bottom diffusion layer 23 is in contact with at least one intermediate member 24 of a material that can be heated by magnetic induction housed between the bottom diffusion layer 23 and the outer jacket 22. An intermediate member 24 of this kind made from a material that can be heated by magnetic induction is sometimes called a "susceptor". When it is placed in a high-frequency alternating magnetic field, electrical currents are induced in a member of this kind which heat the member if it has an appropriate resistivity.

In one advantageous embodiment of the invention the member 24 made from a material that can be heated by magnetic induction is made from food grade ferritic stainless steel, for example F17 type steel.

A member 24 of the above kind made from a material that can be heated by magnetic induction can be in the form of a perforated plate pressed onto the corresponding diffusion layer 23 to attach it thereto.

The bottom diffusion layer 23 is pressed to a cloche shape with a U-shape upstanding rim 26 to form a peripheral groove. The plastics material outer jacket 22 can be made separately from a thermosetting plastics material blank formed by any appropriate method of hardening it. The peripheral rim of the outer jacket 22 has a bottom annular slot having an inside lip shaped to engage in the peripheral groove of the bottom diffusion layer 23. For assembling these components a bead of food grade glue, for example food grade silicone, is deposited in the peripheral groove of the bottom diffusion layer 23 and the peripheral rim of the outer jacket 22 is forced into the latter.

Figure 5:
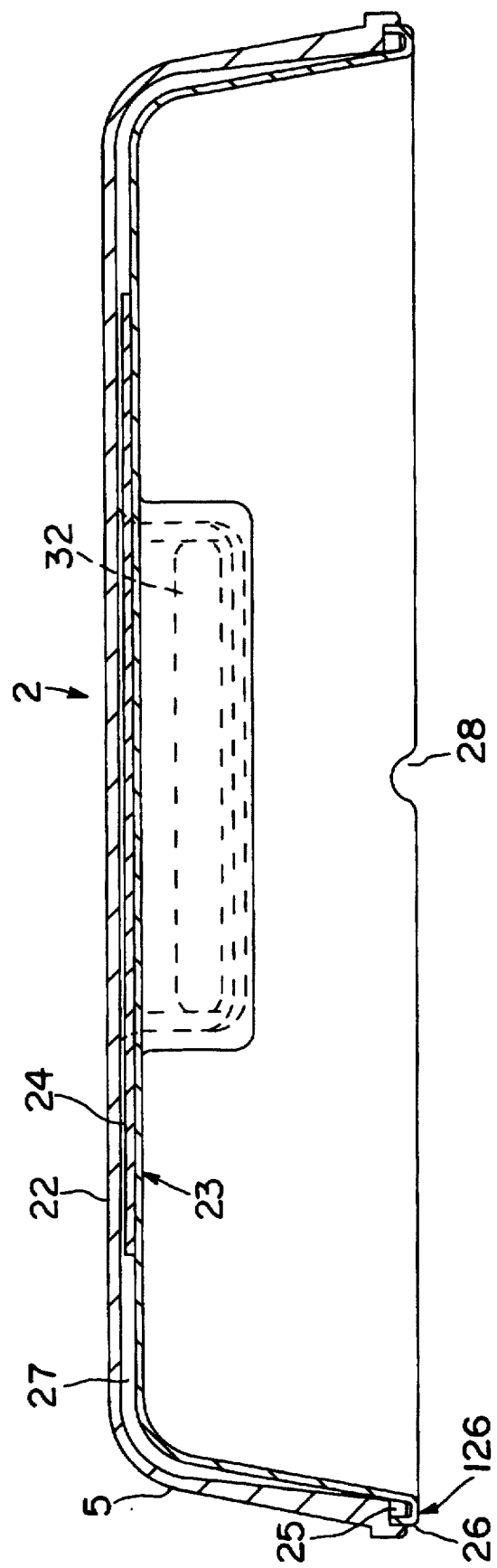
FIG. 5 is a cross-section taken along the line 5—5 in FIG. 4.

In the embodiment shown in FIGS. 2, 3 and 5 the outer jacket 22 and the diffusion layer 23 of the cloche 2 are glued together at their respective edges 25 and 26, leaving a thin layer 27 of air between the outer jacket 22 and the diffusion layer 23 in the central part of the cloche 2. The thin layer 27 of air contributes to the thermal insulation of the cloche, preventing heat diffusing out and excessive heating of the outer jacket 22 of the cloche 2, promoting the heating of the diffusion layer 23.

In the embodiment shown, the intermediate member 24 made from a material that can be heated by magnetic induction is a perforated disc placed in the central area of the top wall of the cloche 2, said area of the top wall of the cloche 2 being generally plane. An embodiment of this kind is adapted to cooperate with plane intermediate induction shelves like the shelf 18 of the console 17 shown in FIG. 11.

Alternatively, members 24 made from a material that can be heated by magnetic induction can be placed at the periphery of the cloche 2, i.e. arranged along its lateral wall 5. In this case the cloche is adapted to cooperate with magnetic field generator means disposed along lateral walls of a heating enclosure spaced to receive at least one meal tray fitted with a cloche.

As can be seen in FIGS. 2 and 4 through 6, at least two orifices 28 and 29 are provided in opposite areas of the lower part of the peripheral wall 5 around the interior space 4.

In the embodiment shown in the figures, the orifices 28 and 29 are notches or deformations in the contact edge of the cloche 2, i.e. the edge adapted to rest on tray body 1. The notches or deformations shown have a semi-circular section with a radius of about 4 mm. Alternatively, similar notches or deformations can be provided in the edge of the tray body 1 on which a flat edge of the cloche 2 rests.

In the embodiment shown in the figures, the base structure 6 of the tray body 1 has a flat top peripheral rim 8 in a horizontal plane and the top diffusion layer 19 has a flat top peripheral rim 21 of which only the peripheral edge portion is embedded in the plastics material of the base structure 6. Accordingly, a portion of the rim 21 defines a peripheral strip 121 the top face of which is uncovered and therefore accessible to support the bottom edge of the cloche 2.

Simultaneously, in the cloche 2, the upstanding bottom peripheral rim 26 of the diffusion layer 23 has a plane bottom peripheral facet 126 forming a strip 2 mm to 3 mm wide, for example, and resting on the uncovered peripheral strip 121 of the rim 21 of the top diffusion layer 19. Accordingly, the top diffusion layer 19 of the tray body 1 comes into contact with the bottom diffusion layer 23 of the cloche at the periphery of the closed space 4 along respective flat contact peripheral rim portions 121 and 126 of the top and bottom diffusion layers 19, 23. This contact heats the top diffusion layer 19 of the tray body 1 by thermal conduction from the intermediate member 24 made from a material that can be heated by magnetic induction via the bottom diffusion layer 23 of the cloche.

Alternatively, the peripheral rim portions 121 and 126 can be conical, toroidal or any other shape allowing good contact of peripheral rim portions 121 and 126 with each other.

In the embodiment shown the top face of the cloche 2 is generally flat and rectangular. Two concave deformations 31 and 32 are formed in the shorter lateral faces to constitute holding handles.

In the embodiment shown in FIGS. 1 and 2 the meal tray has a food heating area 3 provided with said diffusion layers 19 and 23 and said layer 24 of a material that can be heated by induction and a separate area 30 with no diffusion layer and no material that can be heated by induction. The tray body 1 has a generally flat peripheral rim 8 shaped to engage in the slides 16 of the trolley 11 shown in FIG. 10. The rim 8 can advantageously have excrescences or deformations 33 making it obligatory to insert the tray body 1 in a particular longitudinal direction into the slides 16 so as to position the food heating area 3 in line with the magnetic field generator means such as the shelves 18 of the console 17. For example, FIG. 10 shows lugs such as the lug 34 associated with the slide 16 forming an abutment to prevent insertion of the meal tray in the other longitudinal direction.

The present invention is not limited to the embodiment that has been explicitly described but includes variants and generalisation thereof within the scope of the following claims.

What is claimed is:

1. A tray for heating food by insertion in an alternating magnetic induction field produced by an external magnetic field generator device, comprising a lower tray body and a removable upper cloche that can be placed on at least a part of the tray to delimit an interior space between the tray body and the cloche surrounded by a peripheral wall and able to contain said food to be heated, with at least one member made from a material that can be heated by magnetic induction placed in said interior space, wherein:

said tray body has a plastics material base structure forming a bottom exterior surface and edges and including, at least on the part receiving said cloche, a top diffusion layer of a non-magnetic metal that is a good conductor of heat attached to said base structure, said cloche has a plastics material outer jacket fastened to a bottom diffusion layer made of a non-magnetic metal that is a good conductor heat itself in contact with at least one intermediate member made from a material that can be heated by magnetic induction, said top diffusion layer of said tray body comes into contact with said bottom diffusion layer of said cloche at the periphery of said interior space in portions of respective peripheral contact rims of said top and bottom diffusion layers.

2. A tray as claimed in claim 1 wherein at least two orifices are formed in opposite areas of the lower part of said peripheral wall around said interior space.

3. The tray claimed in claim 2 wherein said orifices are notches or deformations in the contact edge of said cloche or said tray body.

4. The tray claimed in claim 1 wherein said diffusion layers are of aluminum.

5. The tray claimed in claim 4 wherein said diffusion layers are covered at least on their visible side with a layer of black polytetrafluorethylene or black enamel.

6. The tray claimed in claim 1 wherein said member made from a material that can be heated by magnetic induction is made of F17 type ferritic stainless steel.

7. The tray claimed in claim 1 wherein said member made of material that can be heated by magnetic induction is pressed onto the corresponding diffusion layer to attach it thereto.

8. The tray claimed in claim 1 wherein said tray body has a thermosetting plastics material base structure associated with the preformed diffusion layer, the edges of said diffusion layer being embedded in said plastics material of said base structure.

9. The tray claimed in claim 1 wherein said cloche has a plastics material outer jacket associated with the preformed diffusion layer, the edges of said outer jacket being glued to an upstanding rim of said diffusion layer.

10. The tray claimed in claim 9 wherein said outer jacket and said diffusion layer of said cloche are fastened together at their edges, leaving a thin layer of air between said outer jacket and said diffusion layer in a central part of said cloche.

11. A tray as claimed in claim 1 having a food heating area provided with said diffusion layer and said layer of a material that can be heated by magnetic induction and a separate area where there is no diffusion layer and no material that can be heated by magnetic induction, said tray body having a generally flat peripheral rim shaped to engage in slides of a support trolley and said rim having excrescences or deformations making it obligatory to introduce said tray body in a particular direction into said slides to position said food heating area in line with magnetic field generator means of a fixed console.

* * * * *